United States Patent [19]

Fischbeck et al.

[11] Patent Number: 4,546,360

[45] Date of Patent: Oct. 8, 1985

[54] ELECTROTHERMIC INK JET

[75] Inventors: Kenneth H. Fischbeck, Dallas; Linda T. Creagh, Argyle; Curt R. Raschke, Dallas, all of Tex.

[73] Assignee: Xerox Corporation, Stamford, Conn.

[21] Appl. No.: 562,344

[22] Filed: Dec. 16, 1983

[51] Int. Cl.4 .............................................. G01D 15/16

[52] U.S. Cl. .................................. 346/1.1; 346/140 R

[58] Field of Search ........................ 346/140 R, 1.1, 75

[56] References Cited

U.S. PATENT DOCUMENTS

| | | | |
|---|---|---|---|
| 3,177,800 | 6/1962 | Welsh | 101/1 |
| 3,179,042 | 6/1962 | Naiman | 101/1 |
| 4,243,994 | 1/1981 | Kobayashi et al. | 346/140 R |
| 4,251,824 | 2/1981 | Hara et al. | 346/140 R |
| 4,275,290 | 6/1981 | Cielo | 346/140 R X |
| 4,296,421 | 10/1981 | Hara et al. | 346/140 R |
| 4,312,009 | 1/1982 | Lange | 346/140 R |
| 4,313,124 | 1/1982 | Hara | 346/140 R |
| 4,330,787 | 5/1982 | Sato et al. | 346/140 R |
| 4,335,389 | 6/1982 | Shirato et al. | 346/140 R |
| 4,338,611 | 7/1982 | Eida et al. | 346/75 |
| 4,432,003 | 2/1984 | Barbero | 346/140 R |

*Primary Examiner*—Joseph W. Hartary

[57] ABSTRACT

A pressure pulse liquid droplet ejecting method wherein an induced current within a liquid causes rapid formation of a vapor. The vapor expansion forces droplet ejection. In a preferred method, the induced current is focused by an intermediate dielectric layer placed in the liquid.

2 Claims, 4 Drawing Figures

ELECTROTHERMIC INK JET

The invention relates to a pulse liquid droplet ejecting method wherein thermal energy induced in the liquid provides droplet ejection by rapid liquid-vapor phase transformation. The invention can be utilized in any pressure pulse drop ejector apparatus; however, it is believed the greatest benefits are realized when the method of this invention is utilized in an ink jet recorder system. Accordingly, the present invention will be described in connection with an ink jet recording system.

A sufficient pressure pulse addressed to a surface tension constrained liquid in a capillary orifice will cause a minute drop of the liquid to be expressed from that orifice. If the liquid is replenished from a reservoir, the procedure can be repeated at a rate dependent only on the time required for replenishment. Devices based on the above phenomenon are referred to as pressure pulse drop ejectors.

Pressure pulse drop ejectors are used as drop-on-demand ink jet marking devices. Other terms for these devices in the literature are impulse jets, asynchronous jets and negative pressure jets. Advantages of using pressure pulse drop ejectors as marking devices are their mechanical simplicity, quiet operation and ability to put visible ink marks on plain paper in accordance with a programmed input bit stream.

The majority of ink droplet ejectors on the market at present utilize piezoelectric transducers to convert an electric pulse to a pressure pulse to express a droplet.

Another method of ejecting droplets has been proposed which uses thermal energy to rapidly vaporize a portion of a liquid in a capillary forming a bubble which forces droplet ejection. For example, in U.S. Pat. No. 3,177,800 to Welsh, a capillary is fitted with a pair of electrodes. A nonconductive dielectric liquid in the capillary is subjected to an electric field between the electrodes which vaporizes or decomposes a portion of the liquid generating sufficient vapors to expel a droplet. It is the volume expansion resulting from the phase transformation of a liquid to a vapor which provides the motive force for droplet ejection. In U.S. Pat. No. 3,179,042 to Naiman, the same process is performed on a conductive liquid resulting in ohmic heating of the liquid and resultant vapor formation and droplet ejection. Another heating technique is disclosed in U.S. Pat. No. 4,243,994. In that process, a resistance heating element is placed in heating relationship to the liquid to provide phase transformation and droplet ejection, again in response to an electrical pulse applied to the heating element. This system, however, requires a more complex apparatus than the simple arrangement disclosed in the Welsh and Naiman patents. The Welsh and Naiman apparatus, however, was subject to rapid electrode erosion and capillary clogging due to sedimentation.

The present invention is intended to provide a simplified yet efficient ink jet droplet ejecting system which is not subject to the above problems. These advantages are obtained by coupling the electric power to the liquid inductively so that the electrodes can be physically isolated from the ink, thus eliminating the possiblity of chemical attack or electrolysis on the electrodes, and preferably by focusing the induced current density into a small well-defined portion of the liquid to improve the electrical coupling.

The invention will be undertood by a reading of the detailed disclosure, particularly when taken in conjunction with the Figures in which a single preferred embodiment is shown. The various Figures are not drawn to scale, and certain features, such as the ink channels and coatings, are greatly exaggerated in size for purposes of explanation. In each of the Figures, parts are given similar number designations for ease of undertanding.

Figure 1:
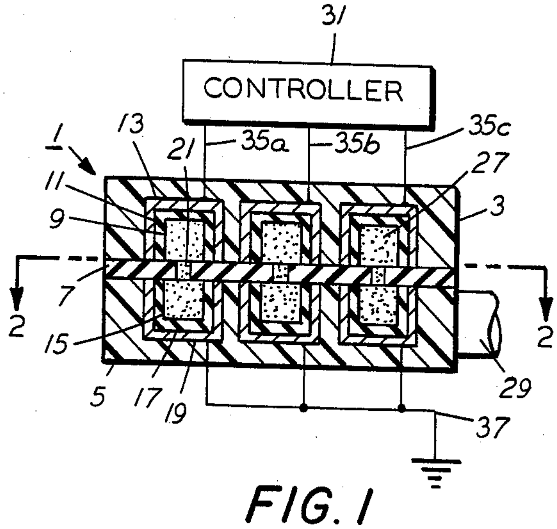
FIG. 1 is a front sectional view taken along lines 1—1 of FIG. 2.
Figure 2:
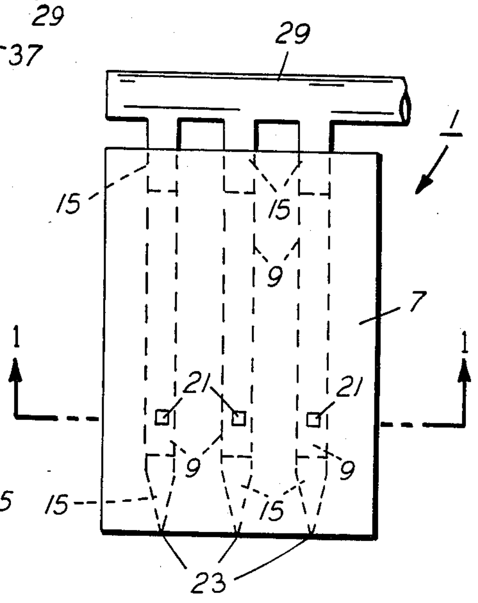
FIG. 2 is top sectional view taken along lines 2—2 of FIG. 1 however, the electrodes and insulating coating layers are not shown.

Referring now to the Figures, there is seen a pressure pulse droplet ejector shown generally as 1. Pressure pulse droplet ejector 1 is made up of three main parts; a top section 3, a bottom section 5 and an insulating separating layer, dielectric layer 7. Formed in top section 3 are upper ink channels 9, insulating coatings 11 and conductive electrodes 13. Formed in bottom section 5 are lower ink channels 15, insulating coatings 17 and conductive electrodes 19. The upper ink channels 9 run almost the entire length of pulse droplet ejector 1. Conductive electrodes 13 and insulating coatings 11 run the entire length of the upper ink channels 9 and are formed such that conductive electrodes 13 are electrically and physically isolated from ink channels 9 and ink 27.

Lower ink channels 15 run the entire length of pulse droplet ejector 1 and terminate in orifices 23 through which droplets 25 are ejected. Conductive electrodes 19 and insulating coatings 17 are provided along the length of lower ink channels 15 and are formed so that conductive electrodes 19 are electrically and physically isolated from ink channels 15 and thus ink 27 contained in ink channels 15. Ink 27 is provided by ink reservoir 29.

A key feature of the present invention is the provision of mall apertures 21 in dielectric layer 7 as will be explained later. Conventionally, pressure pulse droplet ejector 1 is mounted on a printer carriage that can move the pressure pulse droplet ejector in the directions shown by arrow 33, which directions are parallel to the printer platen (not shown) on which a record-receiving surface (not shown), such as paper, is supported in the conventional manner.

The upper conductive electrodes 13 of each ejector are connected to controller 31 by electrical leads 35*a–c* (see FIG. 1) such that the ejectors can be activated individually. Lower conductive electrodes 19 are connected to a common ground, electrode 37.

Figure 4:
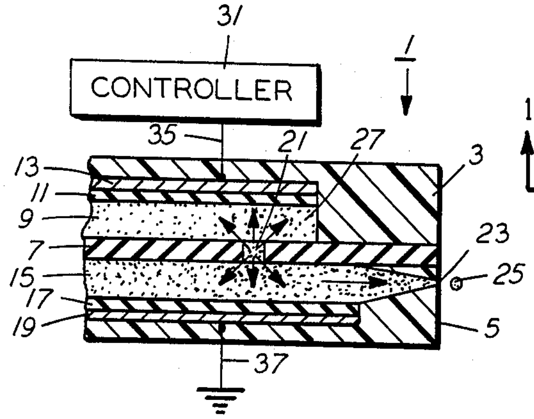
FIG. 4 is a side sectional view of a pressure pulse drop ejector in accordance with this invention.
Figure 3:
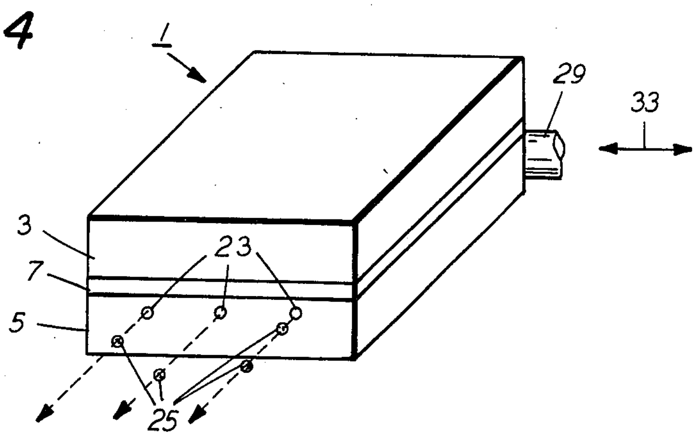
FIG. 3 is a perspective view of the preferred embodiment of this invention.

In operation, ink channels 9, 15 are filled with ink 27. The upper ink channel 9 and lower ink channel 15 are isolated from each other by dielectric layer 7. Aperture 21 in dielectric layer 7 provides the only connection between the upper ink channel 9 and lower ink channel 15. When it is desired to eject a droplet, controller 31 provides by means of electrical leads 35*a–c* the desired upper conductive electrode 13 with an electrical pulse dependent on the image to be formed. By making the insulating coatings 11, 17 thin enough and by providing an ink 27 with some electrical conductivity or permittivity, the electric power can be connected to the ink 27 inductively. The electrodes 13, 19, insulating coating layers 11, 17 and the ink 27 thus form a capacitor. A current is induced in ink 27 by this capacitor. The current is focused by dielectric layer 7 into dielectric layer aperture 21. This focused current density in dielectric layer aperture 21 causes the rapid inductive heating of ink 27 in aperture 21 resulting in the formation of vapor which causes a rapid expansion outward of vapor as indicated by the arrows in the aperture 21 shown in FIG. 4. The rapid expansion causes a pressure pulse to traverse the ink channels 9, 15 resulting in the ejection of a droplet 25 of ink from orifices 23.

A key component of the invention is dielectric layer 7. Dielectric layer 7 should preferably have a good dielectric constant and a high dielectric strength free of pinhole defects. Also, in order to operate the ejectors at a reasonably high frequency, it is necessary that the vapors be condensed or reabsorbed into the ink at a rapid rate. To increase the condensation or reabsorption, it is preferred that dielectric layer 7 be a good conductor of heat. Typical dielectric layer 7 materials would be metal oxides, such as alumina or beryllium oxide, although other suitable materials or combinations thereof could be used.

The size of the aperture 21 is also a key feature of the present invention. For a conventional ink jet ejector, operating at a frequency of less than 10 kHz and having a pulse energy of less than 100 volts per ejector, the dielectric layer 7 thickness would range from about 10 microns to about 100 microns, and the area of the aperture 21 would range from about 1 micron to about 10 microns.

The above invention has been described in connection with a threejet ejector array. Obviously, one or more ejectors could be provided based on the same principle of operation. Also, the ejectors would normally be spaced such that the orifices 23 could be, for example, as close as 1 millimeter for conventional printing.

The main advantage of using dielectric layer 7 and aperture 21 is to allow relatively large conductive electrodes 13, 19 to be used which provides a more efficient electrical coupling, an advantage which is not available using non-inductive phase transformation ejector sytems.

Although a specific embodiment and specific components have been described, it will be understood by one skilled in the art that various changes in the form and details may be made therein without departing from the spirit and scope of the invention. Such modifications and variations should be considered as included within the scope of the appended claims.

What is claimed is:

1. The method of discrete ink droplet ejection from an orifice of an ink jet printhead which comprises the steps of:

(a) providing a liquid ink between at least two spaced electrodes in the printhead, said electrodes being electrically insulated from said liquid ink;

(b) separating the ink adjacent each of said two electrodes by a dielectric layer having an aperture therein, so that the ink adjacent the two spaced electrodes are isolated and communicate with each other only through the aperture; and (c) applying an electrical potential pulse between said electrodes to induce a current pulse between the two electrodes, the aperture in the dielecctric layer causing the induced current pulse to move through the aperture and be focused thereby, the magnitude of the electrical potential pulse being of sufficient magnitude to provide an induced current vaporization of said ink only in the aperture where the induced current is focused in order to form temporarily a bubble in the aperture which causes a discrete ink droplet to be ejected from the printhead orifice by the bubble expansion and collapse.

2. A method of thermally ejecting discrete ink droplets on demand from an ink jet printhead of the type having at least one elongated channel filled with ink and means for providing bursts of thermal energy to the ink in the channel in response to selected data signals, one end of the channel having an orifice from which the droplets are ejected and directed towards a recording medium and the other end communicating with an ink reservoir, each burst of thermal energy momentarily vaporizing a small portion of the ink to form a bubble that effects the droplet ejection, the method comprising the steps of:

providing, in the printhead, at least one elongated channel that is made up of two elongated recesses, one each in repective upper and lower printhead sections, each recess having elongated wall surfaces with opposing end surfaces and having substantially the same cross-sectional areas, one of the recess end surfaces containing the orifice and another of the recess end surfaces being adapted to communicate with the ink reservoir;

forming an electrode on the wall surfaces of each recess;

placing an insulative coating over the electrodes;

assembling the upper and lower printhead sections with an insulative dielectric layer having first and second parallel surfaces and an aperture therethrough at a predetermined location, so that the recesses are aligned with and confront each other, the upper printhead section sealingly contacting the first surface of the dielectric layer and the lower printhead section sealingly contacting the second surface of the dielectric layer, whereby the printhead comprises the upper and lower printhead sections with the dielectric layer sandwiched therebetween and the printhead channel comprises the recesses which become chambers isolated from each other except for the aperture in the dielectric layer;

filling the channel with ink from the ink reservoir under a predetermined pressure, the surface tension of the ink at the orifice forming a meniscus which prevents weeping of the ink therefrom;

connecting one of the electrodes in the recesses to means for selectively applying electrical pulses of predetermined duration thereto and grounding the other, so that the electrodes, the insulative coatings, and the ink perform as a capacitor to induce a current pulse through the ink between the electrodes, while the aperture in the dielectric layer focuses the induced current pulse as it passes therethrough, thus momentarily vaporizing the ink in the aperture and forming a bubble, the growth and collapse of which ejects a discrete droplet from the orifice, whereby the bubble growth and collapse is spaced from the electrodes and the cavitational forces which normally erode the electrodes are substantially eliminated, so that the operating lifetime of the printhead is extended.

* * * * *